(12) United States Patent
Roos et al.

(10) Patent No.: US 8,499,091 B2
(45) Date of Patent: Jul. 30, 2013

(54) METHOD AND AN APPARATUS FOR DATA RECORDING AND STREAMING

(75) Inventors: Joachim Roos, Nacka (SE); Ola Bengtsson, Huddinge (SE); Karl Henriksson, Skarpnäck (SE); Björn Berglöf, Rönninge (SE)

(73) Assignee: Edgeware AB (SE), Stockholm (SE)

( * ) Notice: Subject to any disclaimer, the term of this patent is extended or adjusted under 35 U.S.C. 154(b) by 730 days.

(21) Appl. No.: 12/588,848

(22) Filed: Oct. 29, 2009

(65) Prior Publication Data

US 2010/0115121 A1 May 6, 2010

Related U.S. Application Data

(60) Provisional application No. 61/109,232, filed on Oct. 29, 2008.

(30) Foreign Application Priority Data

Oct. 29, 2008 (SE) ...................................... 0850060

(51) Int. Cl.
*G06F 15/16* (2006.01)

(52) U.S. Cl.
USPC ........... 709/231; 709/232; 709/233; 709/234; 709/227

(58) Field of Classification Search
None
See application file for complete search history.

(56) References Cited

U.S. PATENT DOCUMENTS

| 5,758,085 | A | 5/1998 | Kouoheris et al. |
| 6,138,147 | A | 10/2000 | Weaver et al. |
| 6,169,843 | B1 * | 1/2001 | Lenihan et al. ............... 386/201 |

(Continued)

FOREIGN PATENT DOCUMENTS

| EP | 1 519 383 | 3/2005 |
| GB | 2 441 575 | 3/2008 |

(Continued)

OTHER PUBLICATIONS

Sweden-language Examination Report for SE 0850060-5, (Aug. 4, 2009), 4 pages.

(Continued)

*Primary Examiner* — Djenane Bayard
(74) *Attorney, Agent, or Firm* — Nixon & Vanderhye PC

(57) ABSTRACT

The invention relates to a method and an apparatus for recording and streaming multimedia sequences transmitted from a data distribution device (8) over a data communications network (2), comprising receiving a recording request; receiving a multimedia sequence (DC) relating to the recording request; removing, during reception of the multimedia sequence (DC), all information comprised in the multimedia sequence (DC) except the payload data from the multimedia sequence (DC); determining an empty memory portion (MB) in a temporary memory (6a) of a control unit (6); storing, during reception of the multimedia sequence (DC), the payload data in the memory portion (MB); writing the address of the memory portion (MB) to a second networking unit memory portion (4c''); and when the memory portion (MB) is full, by means of the writing device (4d): writing the address of the memory portion (MB) to a third networking unit memory portion (4c'''), and sending a trigger signal to a file system (6f) of the control unit (6) and by means of the file system (6f) transferring the payload data stored in the full memory portion (MB) to a memory portion (MC) of a memory unit (7).

13 Claims, 8 Drawing Sheets

U.S. PATENT DOCUMENTS

| | | | |
|---|---|---|---|
| 6,966,065 B1 * | 11/2005 | Kitazato et al. | 725/116 |
| 7,058,721 B1 * | 6/2006 | Ellison et al. | 709/231 |
| 7,171,110 B1 * | 1/2007 | Wilshire | 386/231 |
| 8,050,330 B2 * | 11/2011 | Demas et al. | 375/240.28 |
| 8,087,049 B2 * | 12/2011 | Bhagavath et al. | 725/45 |

FOREIGN PATENT DOCUMENTS

| | | |
|---|---|---|
| GB | 2 441 576 | 3/2008 |
| GB | 2 441 577 | 3/2008 |
| WO | 03/084233 | 10/2003 |
| WO | 2008/004211 | 1/2008 |

OTHER PUBLICATIONS

International Search Report for PCT/EP2009/064191 mailed Jan. 28, 2010.

Co-pending U.S. Appl. No. 12/451,343 of Roos, et al., filed Nov. 9, 2009.

* cited by examiner

METHOD AND AN APPARATUS FOR DATA RECORDING AND STREAMING

This application claims priority to SE Application No. 0850060-5, filed 29 Oct. 2008, and claims the benefit of U.S. Provisional Application No. 61/109,232, filed 29 Oct. 2008, the entire contents of each of which are hereby incorporated herein by reference.

TECHNICAL FIELD

The present invention relates to an apparatus and a method for data recording and streaming, as well as, a combination of an apparatus for data recording and streaming and a plurality of user devices.

BACKGROUND

When recording and streaming media data during reception of it, for example in the case of TV or radio channel transmissions, it is desirable to provide the media data to end users with a minimum amount of time delay. There is also a desire to efficiently record several TV or radio channel transmissions simultaneously.

SUMMARY

Embodiments of the invention provide an apparatus and a method that increase the capacity of data recording and streaming. Especially, embodiments of the invention provide an apparatus and a method that enable efficient recording of several multimedia sequences, e.g. TV channels, simultaneously. By means of the present invention, an efficient recording of multimedia sequences is provided since the number recording steps performed by hardware components are increased and since the number of recording steps performed by software implemented components are reduced as compared to the prior art technique for recording multimedia sequences using TCP/IP-stacks. Furthermore, by means of the present invention, the time delay between recording and streaming of multimedia sequences is reduced.

The invention is defined by the independent claims. Preferred embodiments of the invention are defined by the dependent claims.

DESCRIPTION OF THE FIGURES

Below, embodiments of the invention will be described in more detail with reference to the drawing, in which.

DETAILED DESCRIPTION

Figure 1:
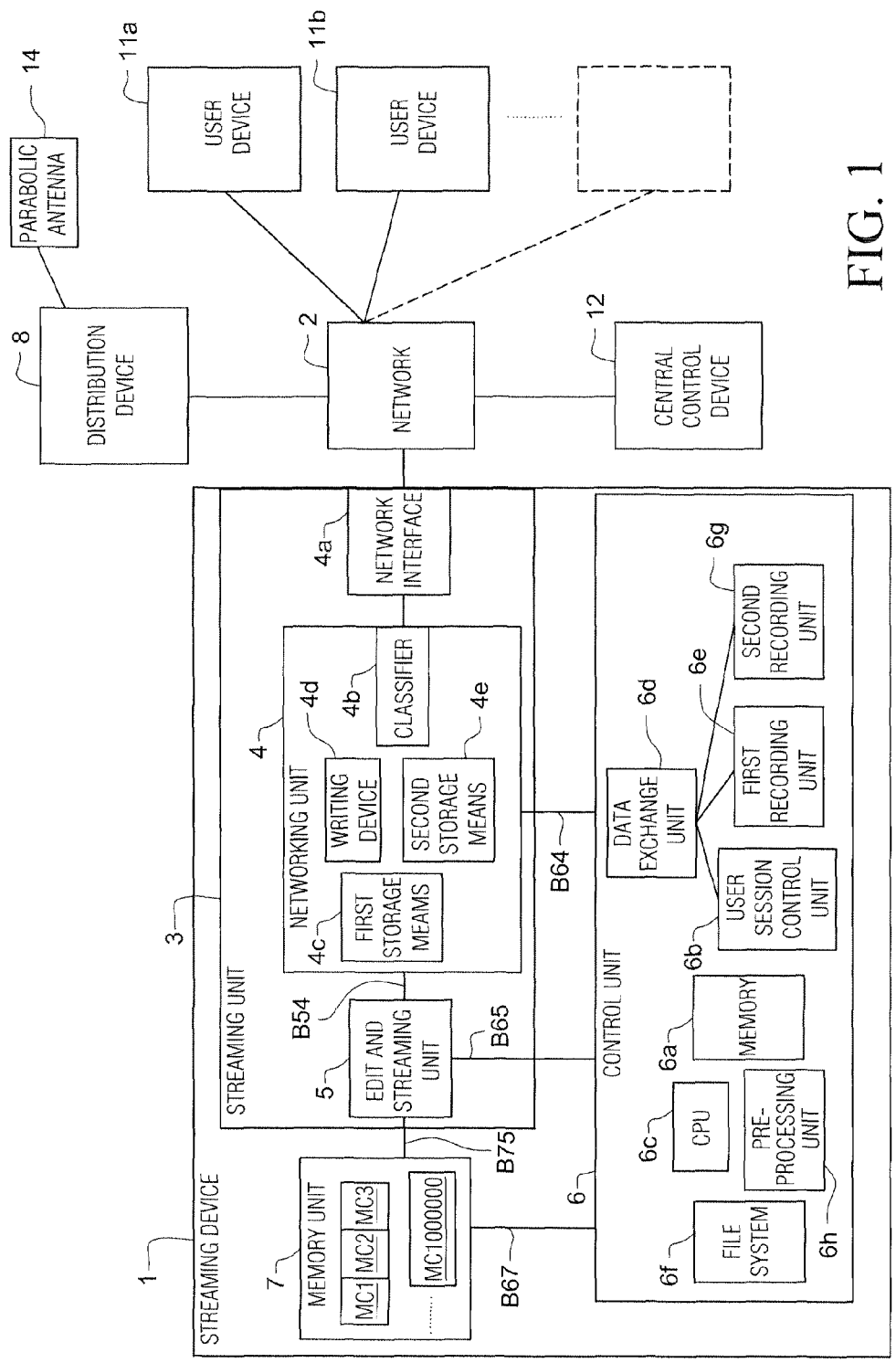
FIG. 1 is a block diagram of a data network and devices connected thereto including a data recording and streaming device according to one embodiment of the invention.

FIG. 1 depicts schematically a system with an apparatus for data recording and streaming, herein also referred to as a data recording and streaming device 1 for data recording and streaming, connectable to a data network 2, e.g., in the form of an IP-network. The network can alternatively be any kind of network, global or local, suitable for transporting data. Here data refers to information in a form that can be used by a computer, router or any other component of a communications system, and it can include text, numbers, sounds, pictures, and combinations thereof.

A plurality of user devices 11a, 11b are also connectable to the network 2. The user devices 11a, 11b can be any kind of remote devices adapted to receive multimedia data, such as set-top boxes, personal video recorders (PVR), personal computers, network personal video recorders (nPVR) or any combination thereof.

At least one data distribution device 8, e.g. a real time video encoder, is connectable to the network 2 and configured to send e.g. multimedia sequences to the user devices 11a, 11b over the data network 2. The at least one data distribution device 8 may be connected to a satellite receiver, e.g. parabolic antenna 14 for multimedia communication. The at least one data distribution device 8 being adapted to receive multimedia communication and to code the received multimedia communication into a specified format and to transmit encoded multimedia communication as multimedia sequences DC1-DC1000 on predefined multicast channels.

As illustrated in FIG. 1, an embodiment of the data recording and streaming device 1 comprises a recording and streaming unit 3, a control unit 6, and a memory unit 7, being connected to each other in a manner described closer below.

The recording and streaming unit 3 comprises a networking unit 4 connected to one or more network interface(-s) 4a comprised in the recording and streaming unit 3. In embodiments, the recording and streaming unit 3 may comprise an editing and streaming unit 5 connected to the networking unit 4.

The networking unit 4 comprises a classifier 4b, a first storage means 4c for storing addresses to memory portions, a writing device 4d for writing payload data to a memory portion, and a second storage means 4e for user requests, control data and/or management data received over the network 2 from e.g. a user device 11a, 11b and/or a central control device 12, respectively, or any other suitable device, and to transmit the received data to the control unit 6. The classifier 4b is arranged in communication with the writing device 4d and the second storage means 4e.

The control unit 6 comprises a processor (CPU) 6c and a memory 6a adapted to temporarily store multimedia payload data. In embodiments, the control unit 6 comprises a user session control unit 6b, a data exchange unit 6d, a first recording unit 6e for controlling the recording of multimedia sequences according to embodiments of the present invention, a file system 6f, a second recording unit 6g, such as a ftp (file transfer protocol) server and/or a unit providing recording of UDP (user datagram protocol) user data, and possible an optional pre-processing unit 6h. In embodiments, the data exchange unit 6d may be realised as a TCP/IP stack.

The classifier 4b is configured to receive, over the network 2 and via the network interface 4a, multimedia sequences DC1-DC1000, e.g. TV channels broadcasting one or more TV programs or parts thereof, from the data distribution device 8. The number of multimedia sequences may vary, but may be in the interval of 1-10 000, e.g. around 1000. The procedure for storing payload data comprised in multimedia sequences will be described in more detail below.

The classifier 4b is further configured to receive, over the network 2 and via the at least one network interface 4a, user sessions or user session requests, e.g. requests for streaming of one or more multimedia sequences, e.g. TV programs, that has been recorded or that is being recorded at the time of the request, from one or more user devices 11a, 11b. The classifier 4b may also be configured to receive, over the network 2 and via the at least one network interface 4a, control data and/or management data from one or more external control devices, e.g. a central control device 12, configured to control one or more data recording and streaming devices 1. Further, the classifier 4b is adapted to store, via the data exchange unit 6d, the received user session requests in the user session control unit 6b.

Further, the classifier 4b is configured to receive recording requests/instructions. The recording requests/instructions may be received from the central control device 12. The recording requests/instructions may be received without or with minimal interference by users. In this description, the wording recording request will mainly be used but it should be understood that it also could be recording instruction. The central control device 12 may be arranged externally of the recording and streaming device 1 whereby it can be configured to remotely control the recording. Further, in embodiments, the central control device 12 may be comprised in the recording and streaming device 1, e.g. in the control unit 6. The central control device 12 may comprise electronic program guides for the respective broadcast TV program. By means of the program guides the recording of the TV programs can be controlled.

The recording requests may be stored in the networking unit second storage means 4e and transferred from the classifier 4b to the first recording unit 6e via the data exchange unit 6d. The first recording unit 6e is adapted to control the recording of multimedia sequences in dependences of the recording requests. Recording requests may have been received by the first recording unit 6e in advance, e.g. minutes, several hours or days before the recording is to be performed.

In embodiments, the classifier 4b may further receive, over the network 2 and via the at least one network interface 4a, user recording requests. The user recording request relates to user requests for the recording of multimedia sequences. The user recording request may be received by the classified 4b from the user devices 11a, 11b directly or indirectly via the central control device 12. The received user recording request may for example comprise information relating to a TV program a user would like to record, such as the name or identification of the TV program, the TV channel, the address, e.g. the IP address, of the data distribution device 8 transmitting the TV program, and the date and time when the program is transmitted.

The control unit 6 can be provided in the form of a specialized unit adapted to the recording and streaming device 1 and comprising the memory 6a for temporary storage of payload data. The memory could be a solid state memory. Alternatively, the control unit 6 can comprise some other type of memory or data storage device, for example a hard drive. In one embodiment, the control unit 6 can be provided as a standard computer with a CPU, RAM (Random access memory) and a hard drive.

The memory unit 7 may be a solid state memory unit adapted to store multimedia payload data, for example TV channel or radio transmissions, movies, music files, and/or advertisements. More generally, the payload data can be any form of multimedia data, whether audio, visual, text or code, provided separately or in any combination.

In an embodiment of the invention, the memory unit 7 comprises a solid state memory in the form of a plurality of interconnected so-called flash memory units, i.e. in-circuit programmable non-volatile memories segmented into memory sectors. Instead of flash memory units, any other suitable type of memory can be used, for example a DRAM or an SRAM.

When streaming recorded data, the recording and streaming unit 3 is adapted to read recorded data in the memory unit 7, edit and schedule the recorded data to be streamed, and send data streams to the user devices 11a, 11b via the network 2.

Figure 2:
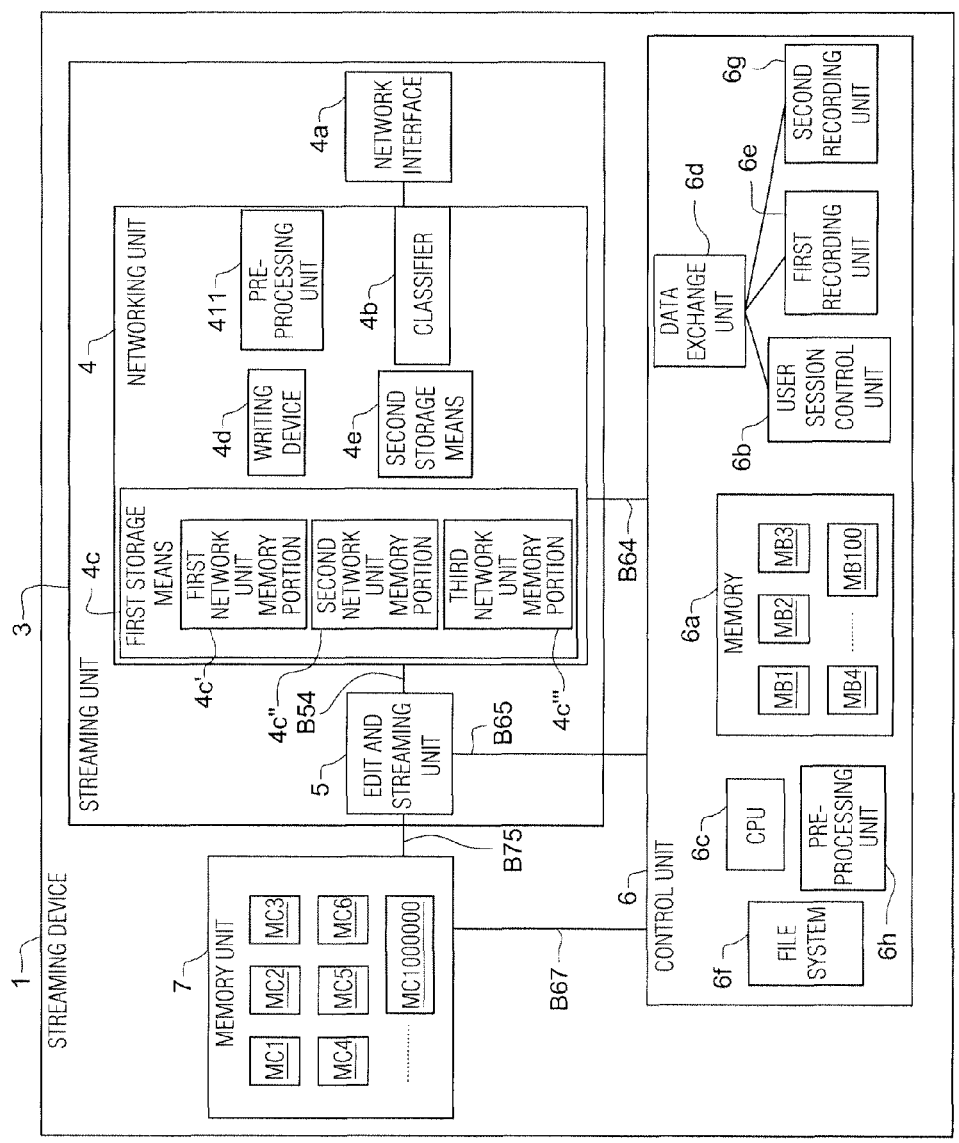
FIGS. 2 and 3 are block diagrams of embodiments of the data recording and streaming device in FIG. 1.
Figure 3:
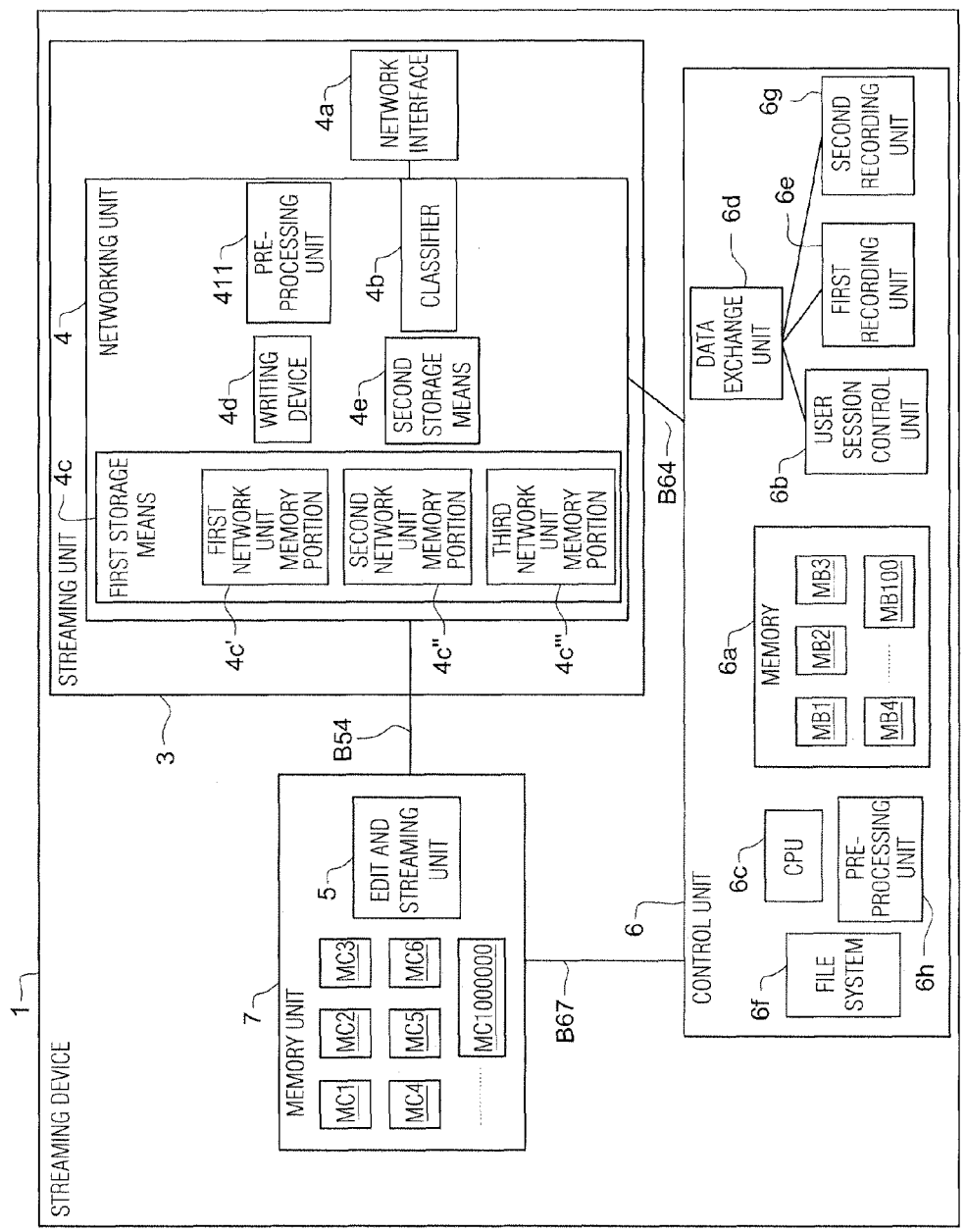

Reference is made to FIGS. 1, 2 and 3. As illustrated, the recording and streaming unit 3 of the data recording and streaming device 1 comprises a networking unit 4, adapted to send and receive data to and from, respectively, the network 2, via a network interface 4a. In embodiments, the recording and streaming unit 3 also comprises an editing and streaming unit 5 connected to the networking unit 4 by a suitable bus B54. The editing and streaming unit 5 is connected to the memory unit 7 by a bus B75.

However, it should be understood that the editing and streaming unit 5 may be arranged externally of the networking unit 4. In embodiments, the memory unit 7 may comprise the editing and streaming unit 5, as schematically illustrated in FIG. 3.

The editing and streaming unit 5 and the networking unit 4 are connected to the control unit 6 by a single bus or a respective bus B65, B64, such as a PCI (Peripheral Component Interconnect) bus.

The networking unit 4 and the editing and streaming unit 5 may comprise a hard-coded function and each of them may comprise a programmed logic device in the form of a field programmable gate array (FPGA). Alternatively, any other suitable type of programmed logic device can be used, such as programmable array logic (PAL), programmable logic device (PLD), or macrocell array or an application specific integrated circuit (ASIC). However, it should be understood that parts of the functions can be implemented as a network processing unit (NPU).

Initiating of the Apparatus for Recording and Streaming

Figure 5A:
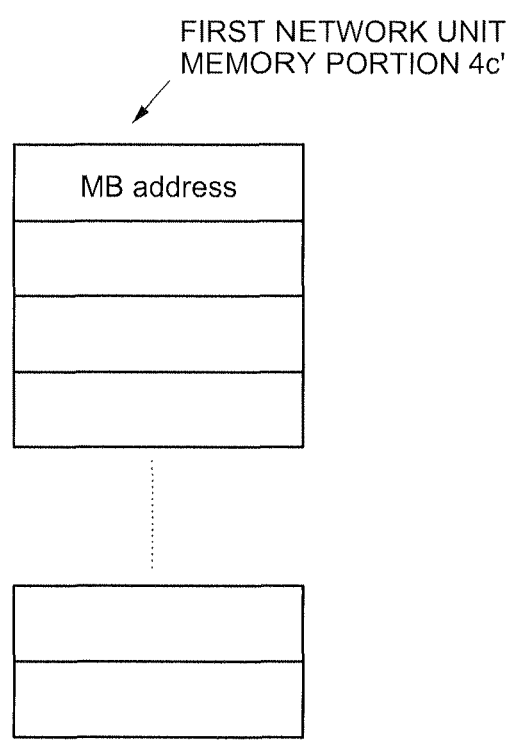

When setting up the apparatus for recording and streaming, the TV channels possible for recording are defined. For example, the first recording unit 6e for controlling the recording of multimedia sequences is informed of the multicast address and port number of the different available TV channels, e.g. Swedish television channel 1, Swedish television channel 2, TV3, TV4, Danish television channel 1 etc. Further, all memory portions MB comprised in the memory 6a of the control unit 6 are empty and the address of these empty memory portions MB are stored in the first storage means 4c of the network unit 4, more specifically in a first networking unit memory portion 4c' of the first storage means 4c, cf. FIG. 5a schematically illustrating an embodiment of the first networking unit memory portion 4c'. The first networking unit memory portion 4c' may be arranged as a FIFO (First In, First Out) data structure.

Initiation of Recording of a Program or Programs

When a request for recording one or more multimedia sequences transmitted by an available TV channel is received, the first recording unit 6e is adapted to create a file in the file system 6f and to associate the file with the TV channel, i.e. by associating the IP address and the port number of the TV channel with the file. The file being adapted to comprise payload data of the transmitted multimedia sequences, the payload data being stored in the memory unit 7 by means of the file system 6f as will be described below.

When the file has been created in the file system 6f, the first recording unit 6e is adapted to configure the classifier 4b to be a possible route for payload data flows transmitted by the TV channel, e.g. by joining the multicast group for reception of payload data flows. Further, during initiation, a second networking unit memory portion 4c" in the networking unit 4 is set up with the address, e.g. the IP address, and the port number relating to the TV channel(-s) that are allowed, cf. FIG. 5b. The second networking unit memory portion 4c" is further configured to comprise the address and length of memory portions MB; MB addresses and MB length, respectively. Further, each row is associated with a recording identity ID which will be associated with a file created when the recording request was received as previously described.

Recording of a Program or Programs

The data recording and streaming device 1 is adapted to receive, via the network 2 and via the network interface 4a, a plurality of multimedia sequences DC1-DC1000 from at least one data distribution device 8. The latter can be in the form of a so called real-time video encoder, adapted to send by multicasting a plurality of TV channels via the network 2. Alternatively, the multimedia sequences DC1-DC1000 can be received from the data distribution device 8 by unicast or broadcast transmissions.

In this example, each of the multimedia sequences DC1-DC1000 corresponds to one TV channel transmission, which can include any type of programming, including live TV programs, for example displaying a sports event.

It should be noted that any of the multimedia sequences DC1-DC1000 can contain payload data sets, for example motion picture videos, as described in the patent applications GB0700311.4, GB0700313.0, GB0700343.7, and GB0700415.3, filed by the applicant and incorporated herein by reference. Such payload data sets can be received at a rate in which their contents are viewed at normal presentation (e.g. display) speed, i.e. at a real time rate.

It should also be noted that, although only one data distribution device 8 is shown in FIG. 1, alternatively, the data recording and streaming device 1 can be adapted to receive simultaneously a plurality of multimedia sequences DC1-DC1000 from a plurality of data distribution devices 8.

Further, it should be understood that a single TV channel may be available for parallel recording of multimedia sequences transmitted from that single TV channel. This may for example be the case when the recording of a first TV program continues after the first TV program has ended in order to make sure that the payload data relating to the end of the first TV program have been recorded, and when the recording of a second TV program starts before the first TV program has ended in order to make sure that the payload data relating to the beginning of the second TV program will be recorded.

The recording and streaming device 1 is adapted to store the payload data flows comprised in the multimedia sequences DC1-DC1000 as they are received. More specifically, the recording and streaming device 1 is adapted to store the payload data flows in real time, continuously. As previously mentioned and with reference to FIGS. 1, 2 and 3, the recording and streaming device 3 comprises a classifier 4b and a writing device 4d.

The classifier 4b is adapted to analyze a data packet received from the data distribution device 8 via the network 2 and the network interface 4a.

The classifier 4b is further adapted to separate between different kinds of data packets. Especially, the classifier 4b is adapted to separate between data packets comprising a multimedia sequences DC1-DC1000, such as TV channels, and data packets comprising control data, user session requests, user recording request etc. Further, the classifier 4b may be adapted to stop and/or drop data traffic not relating to multimedia payload data to be recorded or streamed. Furthermore, the classifier 4b may be adapted to drop and/or stop data traffic not relating to control data, user request etc relating to multimedia payload data to be recorded or streamed.

The classifier 4b is adapted to read the address, e.g. the IP address and/or a port number, of a received data packet in order to determine whether the data packets relate to TV channel that is being recorded. For each received data packet, the classifier 4b compares the read address and/or port number with the addresses and/or port numbers stored in the second networking unit memory portion 4c" of the first storage means 4c. If the read address and/or port number is comprised in the second networking unit memory portion 4c", the multimedia sequences is accepted for recording and the classifier 4b is configured to remove all information except the payload data from the data packet. Further, the classifier 4b is configured to temporarily store payload data in one of a plurality of memory portions MB comprised in temporary memory storage 6a, as will be described in more detail below. The memory storage 6a being comprised in or arranged in communication with the control unit 6.

The writing device 4d being adapted to receive payload data from the classifier 4b and to allocate for each of the payload flows a memory portion MB1-MB100 comprised in the memory storage 6a. Alternatively, the writing device 4d can be adapted to allocate for each of the payload flows a memory portion MC1-MC1000000 in the memory unit 7.

It should be understood that the number of memory portions MB may vary. In embodiments, the number may be in the interval of 50-500, e.g. around 100. In embodiments, the number of memory portions MC in the memory unit 7 may be much more than the number of memory portions MB in the control unit 6. For example, the number of memory portions MC may be a multiple of the memory portions MB, e.g. 10 to 100 000 times the number of memory portions MB. In embodiments, the number of memory portions MC is 1 000 000. In embodiments, the memory portions MB1-MB100, MC1-MC1000000 are of the same size, e.g. 16 or 32 kB.

More specifically, when payload data comprising parts of a TV program is to be recorded, the classifier 4b is adapted to identify the TV channel, e.g. Swedish television channel 1, transmitting the TV program to be recorded. The classifier 4b communicates with the writing device 4d adapted to select one empty memory portion, e.g. MB1, of the memory portions MB1-MB100 for storing the payload data therein. Further, the writing device 4d is adapted to keep track of the selected memory portion MB1 and that parts of the TV program are stored in that memory portion MB1. Furthermore, other parts of the TV program will be stored in other memory portions e.g. memory portions MB2-MB10, and the writing device 4d will keep track of the memory portions MB1-MB10 comprising parts of the TV program. When a memory portion MB1-MB100 is full, the control unit 6 will be notified as will be described in more detail below.

It should be understood that the writing device 4d may be configured to keep track of and to handle several simultaneous recording sessions.

The writing device 4d is arranged in communication with the networking unit storage means 4c, also referred to as the first storage means. As previously described, the networking unit storage means 4c comprises a first networking unit memory portion 4c', a second networking unit memory portion 4c", and a third networking unit memory portion 4c'''.

The first networking unit memory portion 4c' is adapted to store the address to empty memory portions MB1-MB100, i.e. the address to those memory portions MB1-MB100 of the temporary memory 6a not comprising any data, cf. FIG. 5a.

Figure 5B:
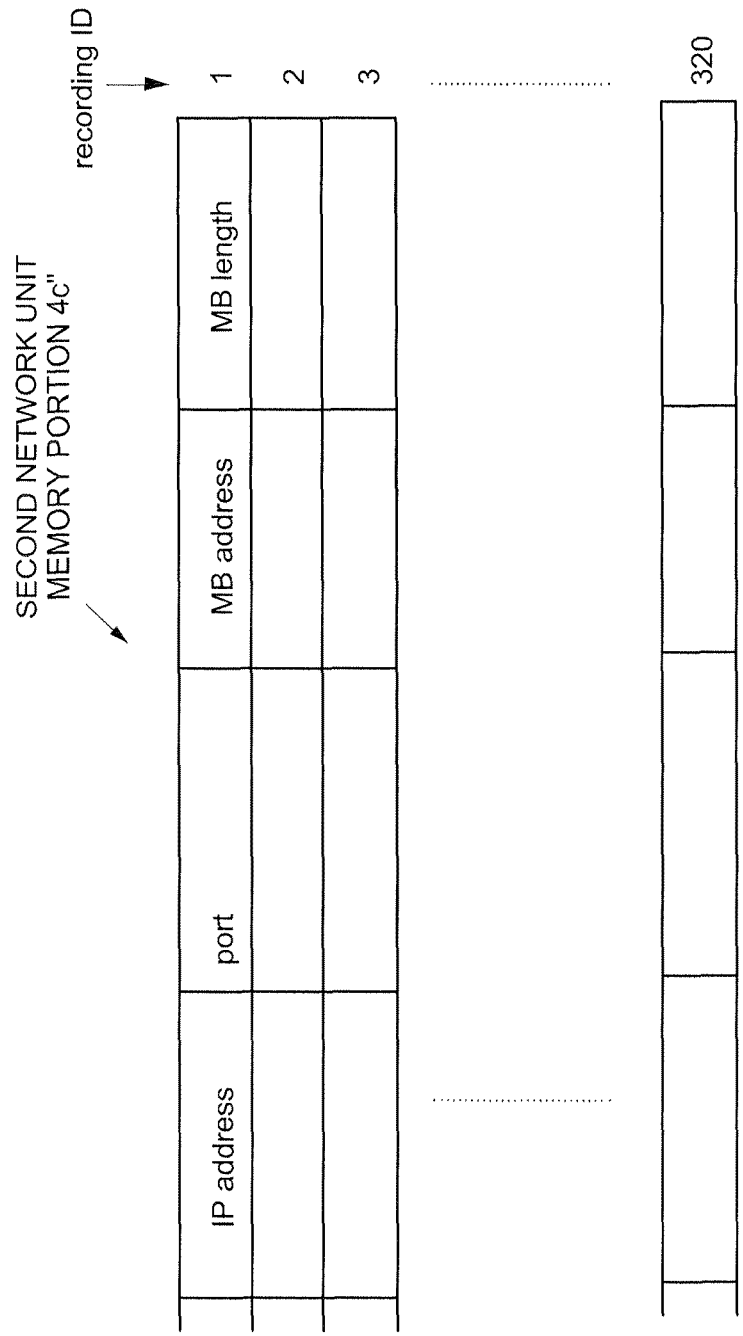

The second networking unit memory portion 4c" is adapted to store the address to memory portions MB1-MB100 comprising data but which memory portions MB1-MB100 are not full, i.e. the address to those memory portions MB1-MB100 that comprise data and that can receive more data, cf. FIG. 5b. As illustrated, the second networking unit memory portion 4c" may further comprise information about the length of the memory portion MB storing payload data of a received data packet, the IP address and the port number of the TV channel associated with the received data packet. Each row of the second networking unit memory portion 4c" is associated with a recording identity ID as illustrated in FIG. 5b, and each recording identity ID is associated with at least one of the files created during the initiation previously described.

Figure 5C:
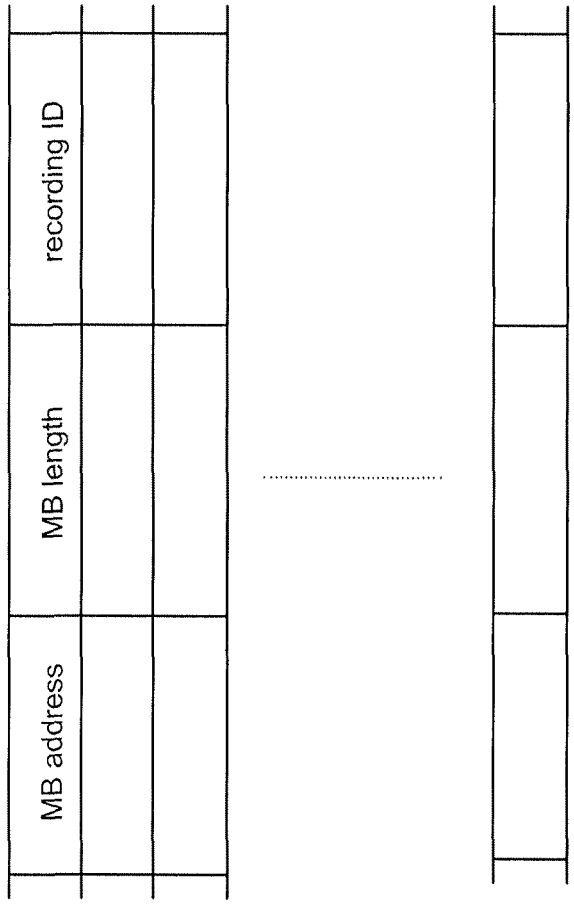

The third networking unit portion 4c''' is adapted to store the address to full memory portions MB1-MB100, i.e. the address to those memory portions MB1-MB100 that are full and cannot comprise any more data. As illustrated in FIG. 5c, the third networking unit memory portion 4c''' comprises the MB address, the MB length, and the recording identity ID. The third networking unit memory portion 4c''' may be arranged as a FIFO data structure.

The third networking unit memory portion 4c''' may further comprise file information relating to the files with which the full memory portions MB1-MB100 and the stored payload data are associated. Such file information may for example comprise a recording identity ID, cf. FIG. 5c. The file system 6f is configured to use the recording identities when storing payload data in memory portions MC of the memory unit 7.

In cases when multimedia sequences, e.g. two TV channels from a single TV channel is recorded in parallel, e.g. in the case of recording of the two consecutive TV programs with an overlap, the recording identity ID may be used by the file system 6f when controlling that the same recorded payload data in one memory portion MB of the control unit 6 is to be used in two different files and to be stored in two different memory portions MC of the memory unit 7.

By means of the first networking unit memory portions 4c', the writing device 4d can keep track of the addresses to empty memory portions MB1-MB100, whereby the writing device 4d can determine where to write new payload data. The writing device 4d starts to write payload data to one of the empty memory portions MB1-MB100 and continues to write payload data to the memory portion MB1-MB100 until the memory portion MB1-MB100 is full. When the writing device 4d has started to write to an empty memory portion MB, the address of that memory portion MB is removed from the first networking unit memory portion 4c' and added to the second networking unit memory portion 4c". Further, the length of the memory portion MB, and the IP address and port number of the TV channel are added to the second networking unit memory portion 4c". When the memory portion MB is full, the writing device 4d removes the address of that memory portion MB together with the MB length, the IP address and the port number from the second networking unit memory portion 4c". The MB address, the MB length and the recording ID will be added to the third networking unit memory portion 4c'''. Further, the writing device 4d is adapted to alert the control unit 6 in a manner described closer below.

In embodiments, the control unit 6 is alerted by the writing device 4d sending a trigger signal to the control unit 6, whereby the control unit 6 is adapted to remove the contents of the full memory portion MB1-MB100 and forward the contents to a memory portion MC1-MC1000000 of the memory unit 7 via bus 67.

In embodiments, the writing device 4d sends a trigger signal to the file system 6f comprised in the control unit 6. The trigger signal comprising trigger information about the file with which the full memory portion MB1-MB100 and the stored payload data are associated. The trigger information may comprise the recording identity, recording ID, of the file. The file system 6f being adapted to, based on the trigger information, read in the third networking unit memory portion 4c''' the address of the full memory portion MB1-MB100 associated with the file. By means of the address of the full memory portion MB1-MB100, the file system reads and removes payload data from the memory portion MB1-MB100 and transfers the read payload data to the memory unit 7 and stores the transferred payload data in an empty memory portion MC1-MC1000000 comprised in the memory unit 7 as will be described below.

When the recording time is over for a TV channel transmission, e.g. when the finishing time of a TV channel transmission has been passed, i.e. when one or more TV programs or one or more parts thereof has been recorded, the first recording unit 6e closes down the reception of the transmission from the TV channel and leaves the multicast group. If the second networking unit memory portion 4c" comprises an address to a memory portion MB comprising payload data relating to the TV channel transmission, that address is moved from the second networking unit memory portion 4c" to the third networking unit memory portion 4c''', whereby the writing device 4d will trigger the control unit 6 causing the payload data stored in the memory portion to be transferred to a memory unit 7 by the file system 6f. When all payload data relating to the TV channel transmission have been stored in the memory unit 7, as described below, the file relating to the TV channel transmission is closed.

Figure 6A:
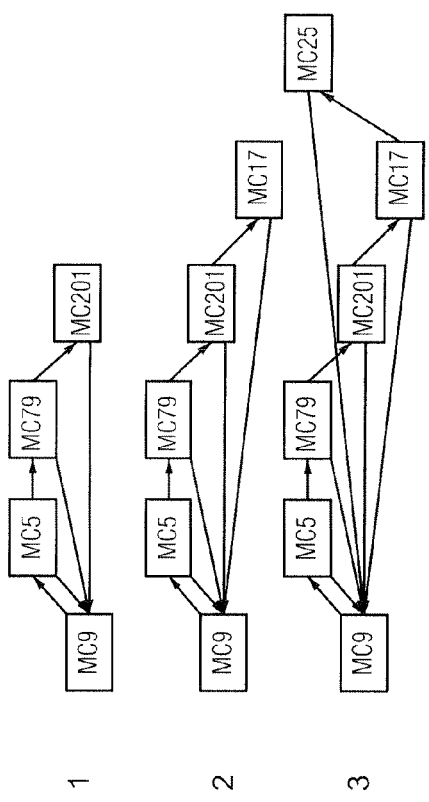
Figure 6B:
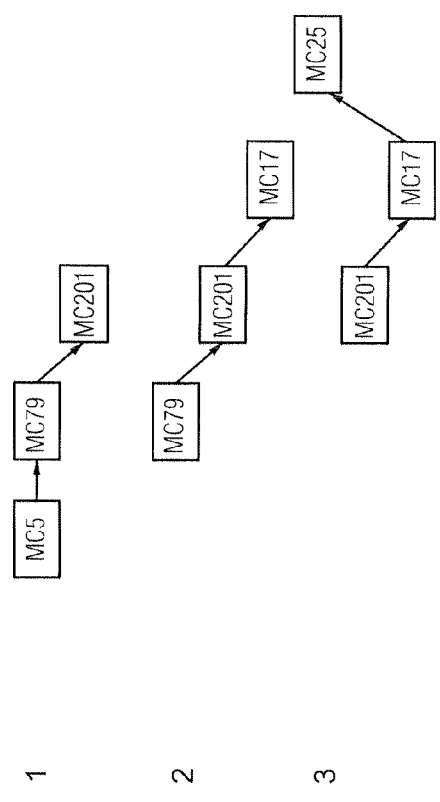

FIGS. 6a and 6b schematically illustrate examples of two different ways to store payload data in the memory unit 7.

In FIG. 6a1, the payload data stored in a normal way is exemplified. When the file system 6f stores payload data in the memory unit 7, it firstly allocate a first memory portion MC9 configured to comprise metadata such as the file name, control information, information about the length of the file, e.g. the total number of bytes or the total number of minutes of the file. However, the first memory portion MC9 is empty or incomplete until all payload data relating to a TV channel transmission have been stored in the memory unit 7, at which time, metadata is stored to the first memory portion MC9.

When a first payload data is to be stored, the file system 6f allocates a second memory portion M5 linked to the first memory portion MC9 and having a pointer to the first memory portion MC9. The first payload data is then stored in the second memory portion MC5. When a second payload data is to be stored, the file system 6f allocates a third memory portion M79 linked to the second memory portion MC5 and having a pointer to the first memory portion MC9. The second payload data is then stored in the third memory portion MC79. When a third payload data is to be stored, the file system 6f allocates a fourth memory portion M201 linked to the third memory portion MC79 and having a pointer to the first memory portion MC9. The third payload data is then stored in the fourth memory portion MC201. It should be understood that the number of memory portions linked as described in this example can vary in dependence of i.a. the length of the multimedia sequence to be recorded and the size of the memory portions MC.

FIGS. 6a2 and 6a3 schematically illustrates how five memory portions and six memory portions, respectively, are linked together.

When all payload data relating to a TV channel transmission have been stored, the metadata or parts thereof is written to the first memory portion MC9. During for example start up, the file system 6f can re-create the file and its payload data by means of the metadata comprised in the first memory portion MC9 of the memory unit 7. It should be understood that the memory unit 7 may comprise a plurality of first memory portions MC9 each comprising information for re-creating a stored file of payload data.

In FIG. 6b it is schematically illustrated how memory portions can be stored in a circular manner.

As illustrated in FIG. 6b1, the first, second and third memory portions MC5, MC79, MC201 all comprise payload data and they are linked together but there is no link or pointer to the first memory portion MC5 from the second memory portion MC79 or the third memory portions MC201. This embodiment does not comprise a first memory portion MC9 for metadata as described above. In this embodiment, the file system 6f is configured to keep track of the memory portions used for storing payload data and their relation to each other, i.e. how the memory portions are linked to each other. Especially, the file system 6f is configured to keep track of the first and last memory portions of the file, whereby the file system 6f knows where payload data of a certain file starts and ends.

With reference to FIG. 6b2, when new payload data is to be stored, a new memory portion MC17 is allocated, a link between the memory portion MC201 and MC17 is created, information about the new memory portion MC17 is stored in the file system 6f and the new payload data is stored in MC17. Further, the first memory portion MC5 is removed from the file system 6f as is the link between the first memory portion MC5 and the second memory portion MC79. Consequently, the memory portion MC79 will become the first memory portion.

As illustrated in FIG. 6b3, when new payload data is to be stored, a new memory portion MC25 is allocated, a link between the memory portion MC17 and MC25 is created, information about the new memory portion MC25 is stored in the file system 6f and the new payload data is stored in MC25. Further, the first memory portion MC79 will be removed as described above.

Recording payload data in a circular manner may be advantageous in cases of continuously recording of a TV channel where it may be desirable to provide streaming of the last e.g. 3 hours of the multimedia sequences transmitted from the TV channel, but where it is not desirable to provide streaming of multimedia sequences transmitted for more than 3 hours. It should be understood that the time period 3 hours is only given as an example and that the period could both longer, e.g. several hours, and shorter, e.g. a 1-2 hours or even minutes e.g. 5-55 minutes. Further, it should be understood that instead of providing streaming of the last recorded hours it could be desirable to provide streaming of the last recorded GB (gigabytes), e.g. the last recorded 1 GB, or the like.

The file system 6f is adapted to keep track of files, e.g. TV programs; free i.e. empty, memory portions MC1-MC1000000 of the memory unit 7; and to keep track of memory portions MC1-MC1000000 comprising recorded payload data and of the TV programs related to the recorded payload data. The file system 6f may further comprise information about the name of the files and information about when the filed were created. Furthermore, the files system 6f may comprise the address to the memory portion(-s) MC of memory 7 storing the payload data relating to a TV channel transmission.

When a user requests playback of recorded multimedia payload data, the file system 6f is adapted to send the address to the memory portions MC of memory 7 storing the payload data as an input to editing and streaming unit 5, as will be described below.

The file system 6f may further be adapted to handle other kind of data such as video files recorded via a second recording unit 6g, e.g. an ftp server. In such embodiments, the second recording unit 6g receives from the file system 6f information about which memory portions MB of the memory 6a that are empty and to which the second recording unit 6g may write data. When the second recording unit 6g has finished writing data to the memory portion MB of the memory 6a, the second recording unit 6g will inform the file system 6f that all data has been stored in the memory 6a, whereby the file system 6f will move the data from memory portions MB of the memory 6a to memory portions MC of the memory 7.

When the contents have been removed from the memory portion MB1-MB100, the memory portion MB1-MB100 will be capable to store more data. Therefore, its address will be removed from the third networking unit memory portion $4c'''$ and added to the first networking unit memory portion $4c'$ by means of the writing device 4d.

In embodiments, the classifier 4b forwards payload flows directly to the memory portions MC1-MC1000000 of the memory unit 7 for storage. In such embodiments, the first networking unit memory portion $4c'$ being adapted to store the address to the empty memory portions MC1-MC1000000. The second networking unit memory portion $4c''$ being adapted to store the address to the memory portions MC1-MC1000000 comprising data but are not full. The third networking unit memory portion $4c'''$ being adapted to store the address to the memory portions MC1-MC1000000 having no storage space available, i.e. the address to those memory portions MC1-MC1000000 not capable to store more data. Further, the control unit 6 being adapted to handle the addresses to the memory portions MC1-MC1000000 as described above.

In embodiments, the data is stored in the respective memory portion MC1-MC1000000 in a circular manner, so that when new data is stored, old data is deleted. By adjusting the size of each memory portion MC1-MC1000000, the time interval during which any portion of the respective payload flow is stored can be adjusted as desired, for example to 4 hours, 3 days or 8 days.

As mentioned, the control unit 6 comprises a file system 6f. Further, the control unit 6 is adapted to create and store a memory address scheme in the file system 6f, for which memory address scheme each memory portion MC1-MC1000000 of the memory unit 7 is divided into a number of memory sectors, each of the same size. The size of each memory sector is adapted to the size of a pair of a payload data sub-set and a control data sub-set. The control data sub-set may comprise information about how to link stored payload data sub-set to each other.

As mentioned, the networking unit 4 is adapted to receive the multimedia sequences DC1-DC1000 via the network interface 4a, and is hard coded to detect the incoming traffic of multimedia sequences DC1-DC1000.

The networking unit 4 and the control unit 6, e.g. the file system 6f, may be adapted to optionally pre-process the payload data flows during reception before storage. In embodiments, the pre-processing of each payload data flow may be divided into a first, second and third pre-processing stage, the first pre-processing stage may be performed by the networking unit 4 and the second and third pre-processing stages may be performed by the control unit 6. The networking unit 4 may comprise an optional hard-coded first pre-processing unit 411, adapted to perform the optional first pre-processing stage, cf. FIGS. 2 and 3.

The control unit 6, e.g. the file system 6*f*, may be adapted control an optional pre-processor 6*h* to extract information, such as meta data, from the full memory portions MB. This information may be used as control data to link payload data to each other. In embodiments, the control data is used to link payload data stored in the memory portions MC of the memory 7.

As stated, the multimedia sequences DC1-DC1000, requested by the user devices 11*a*, 11*b* can be TV channel transmissions. The control data may provide a linking structure for each playback mode that can be requested, e.g. normal viewing speed mode 1X, and trick-play modes including three fast forward modes FW1, FW2, FW3, and three fast reverse modes RW1, RW2, RW3.

Each payload data flow comprises as is known in the art data for displaying sequentially a plurality of picture frames in the user devices. At the trick play modes, the linking structure selects and indicates the frames that are to be streamed. For example, after a frame which is not the last in a payload data sub-set, a frame in another payload data sub-set can be streamed. Also, the subsequent frame can be included in a payload data sub-set which does not follow immediately in a normal viewing speed mode. In this embodiment, as stated above, in compressed videos and at higher playback speeds only frames that do not include references to previous frames for their composition (I-frames) are streamed. This means that the speed of display at trick play modes, compared to normal playback speed, is dependent upon the density of the I-frames within the payload data flows.

Referring to FIG. 2, the control unit 6 is, by means of the file system 6*f*, adapted to send the control data to the memory unit 7 via a bus B67. Each control data subset is stored, in the free space of a memory sub portion of a memory portion MC, in which memory sub portion also a payload data set, related to the respective control data set, is stored. Alternatively, the control unit 6 can be adapted to send the control data to the memory unit 7 via the recording and streaming unit 3.

In the optional third pre-processing stage, the control unit 6 creates, by means of the optional second pre-processing unit 6*h*, control data comprising links providing information for the fast forward modes FW1, FW2, FW3. Of course, in the case of a payload data flow being pre-processed as received in a manner outlined here, the fast forward modes FW1, FW2, FW3 cannot extent further than the latest received identification data group. Thus, for fast forward modes FW1, FW2, FW3, to create a full linking structure for each I-frame, the control unit 6, needs to store position information relating to at least three identification data groups following the identification data group for which the linking structure is to be provided.

In an alternative embodiment, the payload data sub-sets and control data sub-sets may be stored in separate portions of the memory 7, or even in separate memory units. Thereby, the payload data flow can be stored as an uninterrupted sequence of data, and the control data can include pointers to identification data groups guided by values of a traffic flow counter parameter or similar, and information about identification data group sizes.

Streaming

Below examples of functions for data streaming are disclosed.

Reference is made to FIGS. 1 and 2. The networking unit 4 is adapted to receive, via the network interface 4*a*, from user devices 11*a*, 11*b* requests, including requests for playback modes 1X, FW1, FW2, FW3, RW1, RW2, RW3, for content in any of the payload data flows DC1-DC1000. It should be noted that the data recording and streaming device according to a preferred embodiment of the invention is, when used in practice, able to work simultaneously with requests from up to 10000 user devices.

User requests may be stored in the networking unit second storage means 4*e*. As mentioned above, in addition to user requests, the networking unit second storage means 4*e* is adapted to store control data and/or management data received over the network 2, e.g. from a central management device 12.

As mentioned, the networking unit 4 is, by means of the classifier 4*b* and the second storage means 4*e*, adapted to forward the user device requests to the control unit 6, via the data exchange unit 6*d*, to be treated by the user session control unit 6*b*. The user session control unit 6*b* is adapted to read the requests according to a protocol for media streaming requests, such as RTSP (Real Time Streaming Protocol). The user session control unit 6*b* is further adapted to process the requests, each including the identity of the respective user device 11*a*, 11*b*, information of the multimedia sequence relating to the user session request and a possible recording request or a possible playback mode request.

In embodiments, upon reception of a user session request, the user session control unit 6*b* is adapted to, by means of the file system 6*f* to determine if the relevant multimedia sequence already has been recorded and if so, to determine in which memory portions MC1-MC1000000 the multimedia sequence is stored.

If a user session request is received during recording of payload data of the requested TV program(-s), the file system 6*f* is configured to control where to start the streaming of the recorded payload data in order to provide streaming of high quality.

The user session control unit 6*b* is also adapted to extract from the requests sets of request data, each including the identity of the network protocol used for the respective request, and a network address of the respective user device 11*a*, 11*b*. The user session control unit 6*b* is further adapted to send the extracted sets of request data to the networking unit 4 to be stored in networking unit storage means in the form of a RAM memory 4*c*.

Figure 4:
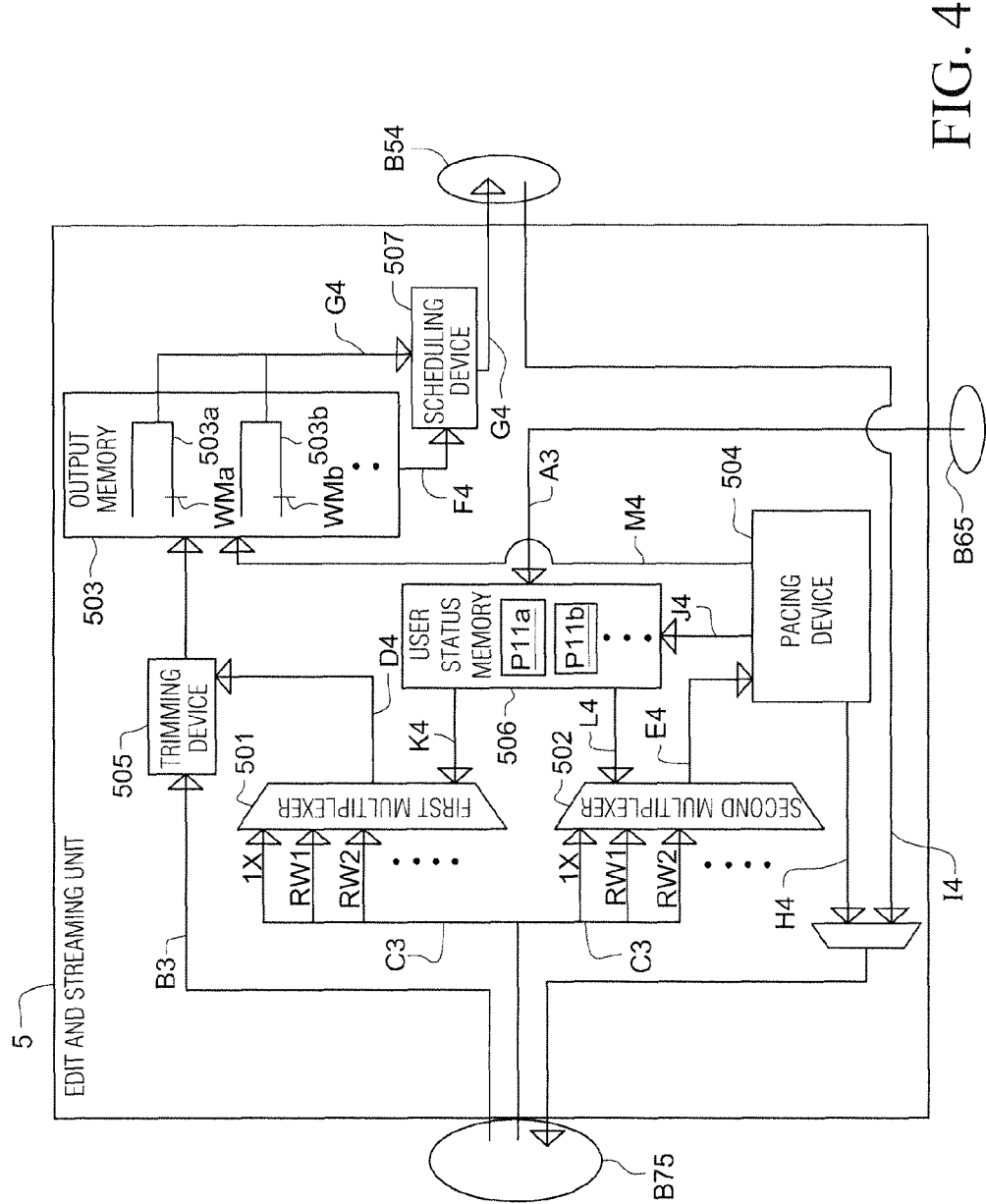
FIG. 4 is a block diagram of a part of the data recording and streaming device in FIGS. 2 and 3, FIGS. 5a, 5b, 5c schematically illustrate portions of a first, a second, and a third networking unit memory portion, respectively, and FIGS. 6a and 6b schematically illustrate examples of two different ways to store payload data in a memory unit.

Referring to FIG. 4, the editing and streaming unit 5 comprises a user status memory 506, adapted to receive, as indicated by the arrow A3, from the control unit 6 user request information, and to store it.

Further, the editing and streaming unit 5 comprises a first and a second multiplexer 501, 502, each adapted to receive from the memory unit 7 control data sub-sets, as indicated by the arrows C3 in FIG. 4. The editing and streaming unit 5 also comprises a trimming device 505, as well as a pacing device 504, and a scheduling device 507. The trimming device 505 is adapted to receive from the memory unit 7 payload data subsets, as indicated by the arrow B3 in FIG. 4, upon requests from the pacing device 504. The first and second multiplexers 501, 502 are adapted to receive control data sub-sets comprising at least one control data portion, upon requests from the pacing device 504.

The user status memory 506 is adapted to receive periodically from the pacing device 504 data, as indicated by the arrow J4 in FIG. 4, corresponding to information regarding the user device, i.e. the stream, for which a read request is currently being sent to the memory unit 7. The user status memory 506 may comprise a plurality of rows, each corresponding to one stream according to a user request P11*a*, P11*b*, and controls the multiplexers 501, 502 for filtering the control data in accordance with the playback modes of the respective user requests. Thus, the user status memory 506 is adapted to send, in response to the stream identity information J4 from the pacing device 504, control signals, indicated by the arrows K4, L4 in FIG. 4, so as to adjust the setting of the multiplexers to the playback mode 1X, FW1, FW2, FW3, RW1, RW2, RW3 of the stream currently being served.

Thus, the first multiplexer 501 is adapted to receive control data sub-sets, and, in dependence on the control of the user status memory 506 concerning the requested playback mode 1X, FW1, FW2, FW3, RW1, RW2, RW3, extract an edit portion of each sub-set of control data, which edit portion gives linking information for the requested playback mode 1X, FW1, FW2, FW3, RW1, RW2, RW3. As indicated by the arrow D4 in FIG. 4, the edit portions of the control data sub-sets are used to read in the trimming device 505, so that a data sequence according to the linking structure of the respective edit portion of the control data sub-sets is sent to an output buffer 503a, 503b of an output memory 503.

The output memory 503 is preferably a large solid state memory, and is arranged so as to provide a plurality of output buffers 503a, 503b, in the form of FIFO (first-in, first-out) queues, corresponding to the plurality of user devices 11a, 11b to which data streaming is carried out. Similarly to the user status memory 506, the output memory 503 is adapted to receive periodically from the pacing device 504 data, as indicated by the arrow M4 in FIG. 4, corresponding to information regarding the user device, i.e. stream, for which a read request is currently being sent to the memory unit 7. Based on this information, an output buffer 503a, 503b is identified for receiving the edited contents of the trimming device 505.

The second multiplexer 502 is also adapted to receive the control data sub-sets and to extract, in dependence of the user status memory control, an edit portion of each control data sub-set, according to an embodiment of the invention. As described further below, each extracted edit portion gives the address in the memory unit 7 of a subsequent payload data sub-set. As indicated by the arrow E4 in FIG. 4, each edit portion of the control data sub-sets is received by the pacing device 504.

The scheduling device 507 is adapted to determine the timing of data outputs from the output memory 503. As indicated by the line F4 in FIG. 4, the scheduling device 507 is adapted to read from data traffic from the output buffers 503a, 503b of the output memory 503 information based on which a bit-rate or a pace, at which the respective payload data flows are to be displayed, can be determined. More specifically, the bit-rate information is determined from known time codes, for example PCR (programme clock reference), used in multimedia display methods, and included in the payload data flows. The bit-rates corresponding to the respective time codes can differ from one payload data flow to another. Thus, the bit-rate of data streamed can differ from one output buffer 503a to another output buffer 503b.

The scheduling device 507 is adapted to control the data traffic from the output buffers 503a, 503b to the networking unit 4, as indicated by the arrow G4 in FIG. 4, in dependence on the bit-rate information for each stream. The data from each output buffer are sent in stream portions, the size of which is adapted to network requirements (e.g. in the order of 1.5 kB). More specifically, the scheduling device 507 is adapted to determine a bite-rate based on time codes in the payload data stream. The stream in question is sent based on this determined bit-rate, and when a further time code is detected, the determined bit-rate is compared to time information from a clock, and the scheduling device 507 is adapted to adjust, based on this comparison, the timing of data sent in the stream. If it is determined that a stream portion of data from one output buffer 503a, 503b should not be sent, the scheduling device 507 makes a similar determination concerning the another output buffer 503a, 503b, and works in this respect as a scheduler, performing a cyclic sequence of determinations whether to send stream portions of data from the respective output buffets 503a, 503b to the networking unit 4.

Referring to FIG. 2, the network unit 4 is adapted to receive stream portions from the respective output buffers 503a, 503b, as well as information identifying the respective output buffer 503a, 503b, and to create, in dependence on the streams served, data packets based on the stream portions from the output buffers 503a, 503b and the request data sets stored in the second storage means 4e. Thereby, the respective output buffer identification provides, or corresponds to an address in the second storage means 4e of the corresponding request data set. The network unit 4 is further adapted to send the data packets to the user devices 11a, 11b via the network interface 4a. Thus, network data packets are created as the data is streamed by the recording and streaming device 1.

The present invention has been described with references to embodiments incorporating details to facilitate the understanding of the invention. Such references to specific embodiments and details thereof are not intended to limit the scope of the claims appended hereto. It will be apparent to those skilled in the art that modifications may be made in the embodiments without departing from the scope of the invention.

The invention claimed is:

1. A method for recording and streaming multimedia sequences transmitted from a data distribution device over a data communications network, the method comprising:

using a recording and streaming unit to receive a recording request;

using the recording and streaming unit to receive a multimedia sequence (DC1-DC1000) relating to the recording request and transmitted from the data distribution device;

using the recording and streaming unit to remove, during reception of the multimedia sequence (DC1-DC1000), all information comprised in the multimedia sequence (DC1-DC1000) except the payload data from the multimedia sequence (DC1-DC1000);

using a first networking unit memory portion comprised in a first memory storage of the recording and streaming device to determine an empty memory portion (MB1-MB100) in a temporary memory of a control unit connected to the recording and streaming unit;

using a writing device comprised in the recording and streaming device to temporarily store, during reception of the multimedia sequence (DC1-DC1000), the payload data in the memory portion (MB1-MB100);

using the writing device to write the address of the memory portion (MB1-MB100) to a second networking unit memory portion;

when the memory portion (MB1-MB100) is full, using the writing device:
to write the address of the memory portion (MB1-MB100) to a third networking unit memory portion, and
to send a trigger signal to a file system of the control unit and by means of the file system transferring the payload data stored in the full memory portion (MB1-MB100) comprised in the temporary memory to a memory portion (MC1-MC1000) of a memory unit connected to the recording and streaming unit and to the control unit, using a pre-processor of the control unit to extract information from the full memory portion, the information being available as control data to link a load data to each other, during reception of the multimedia sequence, receiving in the classifier a user session request relating to one or more multimedia sequence to be streamed, using the classifier to forward the user session request to a user session control unit comprised in the control unit, using the user session control unit to check in the file system if the multimedia sequence associated with the user session request has been recorded, and if the multimedia sequence has been recorded, using the file system to transfer the address to the memory portions (MC) comprising multimedia payload data associated with the multimedia sequence as an input to the editing and streaming unit for streaming of said payload data, and if the user session request is received during recording of payload data of the requested multimedia sequence using the file system to control where to start the streaming of the payload data in order to provide streaming of high quality.

2. The method of claim 1, further comprising: using a classifier comprised in the recording and streaming unit, to receive the recording request, store the recording request in a second storage means comprised in the recording and streaming unit, and transfer, over a data exchange unit, recording requests to a first recording unit comprised in the control unit, and using the first recording unit to control the recording of multimedia sequences in dependence of the recording requests.

3. The method of claim 2, further comprising: using the first recording unit to create a file in the file system and associate the file with a TV channel transmitting the multimedia sequences to be recorded; and to configure the classifier as a possible route for payload data flows relating to the TV channel transmission, the method further comprising setting up the second networking unit memory portion comprised in the first storage means with the IP address and port number of the TV channel.

4. The method of claim 3, further comprising, using the classifier to determine if a received multimedia sequence relates to an available TV channel transmission, and if the received multimedia sequence relate to an available TV channel transmission, using the classifier to activate the writing device for storage of payload data.

5. The method of claim 1, using the writing device to handle several simultaneously recording sessions.

6. The method of claim 1, further comprising:

for each payload data to be stored, allocating a memory portion (MC) in the memory unit;

in the file system keeping track of the relationship between memory portions (MC) storing payload data and of the first memory portion (MC5) and last memory portion (MC201) of the file;

when the sum of the time or the sum of data of the stored payload data in the memory portions (MC5, MC79, MC201) is larger than a predetermined time period or data value, removing the first memory portion (MC5) from the file, allocating a new memory portion (MC17) at the end, storing new payload data at the new memory portion (MC17), and updating the file system (6f) with the new first memory portion (MC79) and the new last memory portion (MC17).

7. An apparatus for recording and streaming multimedia sequences transmitted from a data distribution device over a data communications network, the apparatus comprising:

a recording and streaming unit for receiving a recording request, for receiving a multimedia sequence (DC1-DC1000) relating to the recording request and transmitted from the data distribution device; and for removing, during reception of the multimedia sequence (DC1-DC1000), all information comprised in the multimedia sequence (DC1-DC1000) except the payload data from the multimedia sequence (DC1-DC1000);

a first networking unit memory portion comprised in a first memory storage of the recording and streaming unit, and configured to determine an empty memory portion (MB1-MB100) in a temporary memory of a control unit connected to the recording and streaming unit;

a writing device comprised in the recording and streaming unit, and configured to temporarily store, during reception of the multimedia sequence (DC1-DC1000), the payload data in the memory portion (MB1-MB100); to write the address of the memory portion (MB1-MB100) to a second networking unit memory portion; and, when the memory portion (MB1-MB100) is full, to:

write the address of the memory portion (MB1-MB100) to a third networking unit memory portion, and send a trigger signal to a file system of the control unit, the file system being configured to transfer the payload data stored in the full memory portion (MB1-MB100) comprised in the temporary memory to a memory portion (MC1-MC1000) of a memory unit connected to the recording and streaming unit and to the control unit, a pre-processor, comprised in the control unit, and configured to extract information from the full memory portion which information is available as control data to link a load data to each other, during reception of the multimedia sequence, wherein the classifier is configured to receive a user session request relating to one or more multimedia sequence to be streamed, and to forward the user session request to a user session control unit comprised in the control unit, wherein the user session control unit is configured to check in the file system if the multimedia sequence associated with the user session request has been recorded, and wherein if the multimedia sequence has been recorded, the file system is configured to transfer the address to the memory portions (MC) comprising multimedia payload data associated with the multimedia sequence as an input to the editing and streaming unit for streaming of the payload data, and if the user session request is received during recording of a load data of the requested multimedia sequence, the file system is configured to control where to start the streaming of the payload data in order to provide streaming of high quality.

8. The apparatus of claim 7, further comprising: a classifier comprised in the recording and streaming unit and configured to receive the recording request, to store the recording request in a second storage means comprised in the recording and streaming unit, and to transfer, over a data exchange unit, recording requests to a first recording unit comprised in the control unit, the first recording unit being configured to control the recording of multimedia sequences in dependence of the recording requests.

9. The apparatus of claim 8, wherein the first recording unit is configured to create a file in the file system and associate the file with a TV channel transmitting the multimedia sequences to be recorded; to configure the classifier as a possible route for payload data flows relating to the TV channel transmission, and to set up the second networking unit memory portion comprised in the first storage means with the IP address and port number of the TV channel.

10. The apparatus of claim 9, wherein the classifier is configured to determine if a received multimedia sequence relates to an available TV channel transmission, and if the received multimedia sequence relates to an available TV channel transmission, to activate the writing device for storage of payload data.

11. The apparatus of claim 7, wherein the writing device handles several simultaneously recording sessions.

12. The apparatus of claim 7, wherein the file system is configured to:
- for each payload data to be stored, allocate a memory portion (MC) in the memory unit;
- keep track of the relationship between memory portions (MC) storing payload data and of the first memory portion (MC5) and last memory portion (MC201) of the file;
- when the sum of the time or the sum of data of the stored payload data in the memory portions (MC5, MC79, MC201) is larger than a predetermined time period or data value,
  - remove the first memory portion (MC5) from the file,
  - allocate a new memory portion (MC17) at the end,
  - store new payload data in the new memory portion (MC17), and
  - keep track of the new first memory portion (MC79) and the new last memory portion (MC17).

13. A computer program product comprising a non-transitory computer readable storage media containing program code portions configured to realize one or more steps or functions of claim 1 when executed on a computerized device.

* * * * *